US010312790B2

United States Patent
Mostovoy et al.

(10) Patent No.: US 10,312,790 B2
(45) Date of Patent: Jun. 4, 2019

(54) DEVICE AND METHOD FOR USING A MAGNETIC CLUTCH IN BLDC MOTORS

(71) Applicant: VASTECH HOLDINGS LTD., London (GB)

(72) Inventors: Alexander Mostovoy, Ashkelon (IL); Victor Shlakhetski, Ashqelon (IL)

(73) Assignee: INTELLITECH PTY LTD, Malvern, Victoria (AU)

( * ) Notice: Subject to any disclaimer, the term of this patent is extended or adjusted under 35 U.S.C. 154(b) by 219 days.

(21) Appl. No.: 14/772,005

(22) PCT Filed: Mar. 13, 2014

(86) PCT No.: PCT/IL2014/050286
§ 371 (c)(1),
(2) Date: Sep. 1, 2015

(87) PCT Pub. No.: WO2014/147612
PCT Pub. Date: Sep. 25, 2014

(65) Prior Publication Data
US 2016/0028299 A1 Jan. 28, 2016

(30) Foreign Application Priority Data
Mar. 19, 2013 (WO) .................. PCT/IL2013/050253

(51) Int. Cl.
H02K 7/11 (2006.01)
H02K 49/10 (2006.01)
F16D 27/00 (2006.01)

(52) U.S. Cl.
CPC .......... *H02K 49/106* (2013.01); *F16D 27/00* (2013.01); *H02K 7/11* (2013.01)

(58) Field of Classification Search
CPC ......... H02K 7/11; H02K 49/106; F16D 27/00
(Continued)

(56) References Cited

U.S. PATENT DOCUMENTS

| 700,839 A | 5/1902 | Sessions |
| 2,437,871 A | 2/1943 | Wood |
| 2,705,762 A | 4/1955 | Pile |
| 3,936,683 A | 2/1976 | Walter |

(Continued)

FOREIGN PATENT DOCUMENTS

| CN | 102714454 A | 10/2012 |
| DE | 3732766 | 4/1988 |

(Continued)

OTHER PUBLICATIONS

Office action from a foreign patent office (Chinese patent office) in a counterpart foreign application (201480017007.2; dated Dec. 29, 2016 (6 pages) (English translation also included).

(Continued)

*Primary Examiner* — John K Kim
(74) *Attorney, Agent, or Firm* — F. Michael Sajovec; Williams Mullen (57) ABSTRACT

An apparatus for coupling mechanical power between the rotor of a Brushless DC Motor and an external mechanical load comprises: a) two concentric rings; b) an equal number of magnets connected to the inner ring and to the outer ring; and c) an opposite orientation of the poles of each couple of facing magnets, wherein one magnet is placed on the inner ring, and its facing magnet is placed on the outer ring; wherein the first of said two concentric rings is rotatable around an axis by the application of a force not applied by the second ring, and wherein when said first concentric ring rotates, the second ring rotates as well by the action of magnetic forces.

6 Claims, 8 Drawing Sheets

(58) Field of Classification Search
USPC .............................. 310/78, 113, 114, 14, 103
IPC .............................................. H02K 7/11,49/10
See application file for complete search history.

(56) References Cited

U.S. PATENT DOCUMENTS

| | | | |
|---|---|---|---|
| 4,115,040 A * | 9/1978 | Knorr | H02K 49/106 310/104 |
| 4,291,248 A * | 9/1981 | Rainbolt | H02K 25/00 310/14 |
| 4,381,466 A | 4/1983 | Laenes | |
| 5,376,862 A | 12/1994 | Graid | |
| 5,633,555 A | 5/1997 | Ackermann | |
| 7,508,104 B2 | 3/2009 | Schmidt | |
| 8,221,247 B2 | 7/2012 | Lai | |
| 8,808,096 B2 | 8/2014 | Atkins | |
| 9,013,081 B2 | 4/2015 | Atallah | |
| 9,385,581 B2 | 7/2016 | Enomoto | |
| 9,407,129 B2 * | 8/2016 | Shlakhetski | H02K 1/2726 |
| 2005/0206260 A1 * | 9/2005 | Akiyama | C30B 15/30 310/104 |
| 2011/0037333 A1 | 2/2011 | Kais | |
| 2011/0291504 A1 * | 12/2011 | Niedzialkowski | H02K 7/116 310/83 |
| 2012/0262017 A1 | 10/2012 | Mengibar Rivas | |
| 2012/0280586 A1 | 11/2012 | Englert | |
| 2013/0011317 A1 | 5/2013 | Englert | |
| 2013/0123026 A1 | 5/2013 | Purdy | |
| 2015/0076948 A1 | 3/2015 | Katou | |
| 2016/0028299 A1 * | 1/2016 | Mostovoy | H02K 7/11 310/78 |

FOREIGN PATENT DOCUMENTS

| | | |
|---|---|---|
| EP | 0779699 A1 | 6/1997 |
| EP | 2330724 | 6/2011 |
| FR | 1487492 | 7/1967 |
| FR | 2766029 | 1/1999 |
| FR | 2782419 | 2/2000 |
| GB | 2240666 | 8/1991 |
| JP | H02-139461 U | 11/1990 |
| JP | 1995009087 U | 2/1995 |
| JP | 2000083365 A | 3/2000 |
| JP | 2003-199283 A | 7/2003 |
| JP | 2012205348 A | 10/2012 |
| JP | 2015-061422 | 3/2015 |
| WO | 8101633 | 6/1981 |
| WO | 9607611 | 3/1996 |

OTHER PUBLICATIONS

International Search Report of a counterpart foreign application—PCT/IL2014/050286, 4 pages, dated Jul. 14, 2014.

Written opinion of a counterpart foreign application—PCT/IL2014/050286, 6 pages, dated Jul. 14, 2014.

Written opinion of a counterpart foreign application—PCT/IL2014/050286—with Applicant's written response to Jul. 14, 2014 written opinion, 8 pages, dated Aug. 30, 2015.

Supplementary European Search Report from a foreign patent office in a counterpart foreign application—EP 14 76 7555—dated Sep. 30, 2016 (7 pages).

* cited by examiner

DEVICE AND METHOD FOR USING A MAGNETIC CLUTCH IN BLDC MOTORS

FIELD OF THE INVENTION

The present invention relates to a magnetic clutch architecture designed to couple mechanical power between the rotor of Brushless DC Motors (BLDC) and an external mechanical load, without using direct or indirect mechanical connection such as gears, wheels, strips or other similar arrangements.

BACKGROUND OF THE INVENTION

In many common systems, the connection between different parts of the system is performed by mechanical components. A significant disadvantage of using such connecting parts is the energy loss, caused by friction. Another disadvantage caused by friction is the wear of the connecting surfaces of the parts. As the speed and force between the parts increase, so does the friction and therefore the damage to their surfaces, until they often can no longer function properly.

In systems operating at high speeds, like motors that usually operate in extremely high speeds, the friction and its outcomes are substantial, resulting in the need for many maintenance services and frequent change of parts, which require a great investment of both time and money.

The present invention relates to a device used in BLDC motors, such as the motor described in PCT patent application No. PCT/IL2013/050253

It is an object of the present invention to provide a device and method that overcome the drawbacks of the prior art.

Other objects and advantages of the invention will become apparent as the description proceeds.

SUMMARY OF THE INVENTION

An apparatus for coupling mechanical power between the rotor of a Brushless DC Motor and an external mechanical load, comprises:
  a) two concentric rings;
  b) an equal number of magnets connected to the inner ring and to the outer ring; and
  c) an opposite orientation of the poles of each couple of facing magnets, wherein one magnet is placed on the inner ring, and its facing magnet is placed on the outer ring;
  wherein the first of said two concentric rings is rotatable around an axis by the application of a force not applied by the second ring, and wherein when said first concentric ring rotates, the second ring rotates as well by the action of magnetic forces.

In one embodiment of the invention the rings are flat ring-shaped plates. In another embodiment of the invention each couple of facing magnets are of the same size.

In some embodiments of the invention the magnetic strengths of two facing magnets are essentially the same. In another embodiment of the invention each of the magnets in the inner ring has a facing magnet in the outer ring.

The connecting means, in some embodiments of the invention, connect one of the rings to an external system. In other embodiments of the invention a ring which is not connected to the external system is driven by the rotation of the ring that is connected to the external system and the driven ring is forced to move because of the magnetic force between two coupled magnets.

Typically, the distances between the components of the apparatus are consistent with the desired forces and in some embodiments of the invention the distance between two adjacent magnets on the ring is not the same as the distance between two other adjacent magnets on the same ring.

The invention also encompasses a brushless motor coupled with a clutch comprising two concentric rings, an equal number of magnets connected to the inner ring and to the outer ring, and an opposite orientation of the poles of each couple of facing magnets, wherein one magnet is placed on the inner ring, and its facing magnet is placed on the outer ring, and wherein the first of said two concentric rings is rotatable around an axis by the application of a force not applied by the second ring, and wherein when said first concentric ring rotates, the second ring rotates as well by the action of magnetic forces.

DETAILED DESCRIPTION OF THE INVENTION

Figure 1:
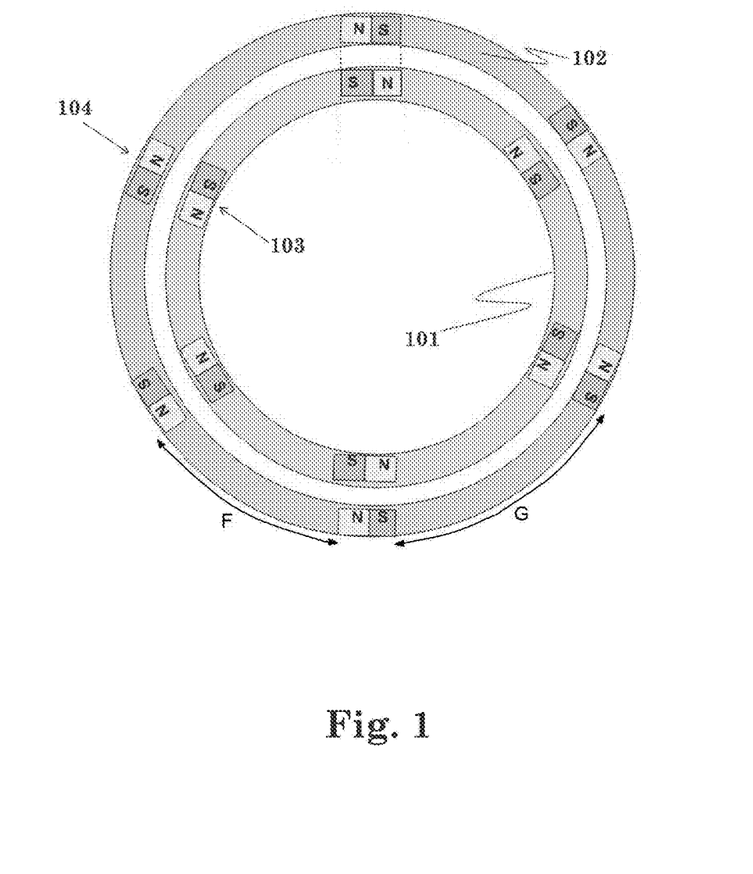
FIG. 1 shows two concentric rings, provided with magnets, according to one embodiment of the invention, in a static state.

FIG. 1 shows two concentric rotating rings 101 and 102 at rest. The inner ring 101 consists of the rotor of a BLDC motor (which can be, for example, the motor of PCT/IL2013/050253-WO/2013/140400), and the outer ring 102 is connected to a mechanical load and provides the power for it. A number of permanent magnets, equal to the number of the magnets in the rotor of the BLDC motor, are mechanically fixed on the outer ring 102 with their S-N axes oriented tangentially to the circumference.

At rest, each one of the magnets 104 located on the outer ring 102, is facing the corresponding magnet 103 located on the rotor 101. The S-N axis orientation of each magnet 104 on the outer ring 102 is opposite to the S-N axis orientation of the corresponding (facing) magnet 103 on the rotor 101. As a result, the magnets 104 on the outer ring 102 are positioned with alternating polarity. Each pair of magnets 104 on outer ring 102 may be equidistantly spaced from one another by a circumferential distance of F. Alternatively, one pair of magnets 104 on outer ring 102 may be spaced from one another by a circumferential distance of F, while another pair of magnets 104 on the same may be spaced from one another by a circumferential distance of G which is greater than F. It should be emphasized that there is no physical connection between the rotor 101 and the outer ring 102. For reasons that will be thoroughly explained later on in this description, based on the laws of magnetostatics, the relative position of the rotor 101 with respect to the outer ring 102, depends on the state of the system—if the system is in a static state or a dynamic state, as will be further described.

In a static state—when the BLCD rotor is at rest, each magnet 104 on the outer ring 102 is exactly aligned in front of the corresponding magnet 103 on the rotor 101, as shown in FIG. 1. In a dynamic state—when the BLCD rotor 101 turns, while the outer ring 102 is connected to a load (not completely free to move), the relative position of each magnet 103 on the rotor ring 101 with respect to the corresponding magnet 104 on the load ring 102, will change and will stabilize to a new state.

Figure 2:
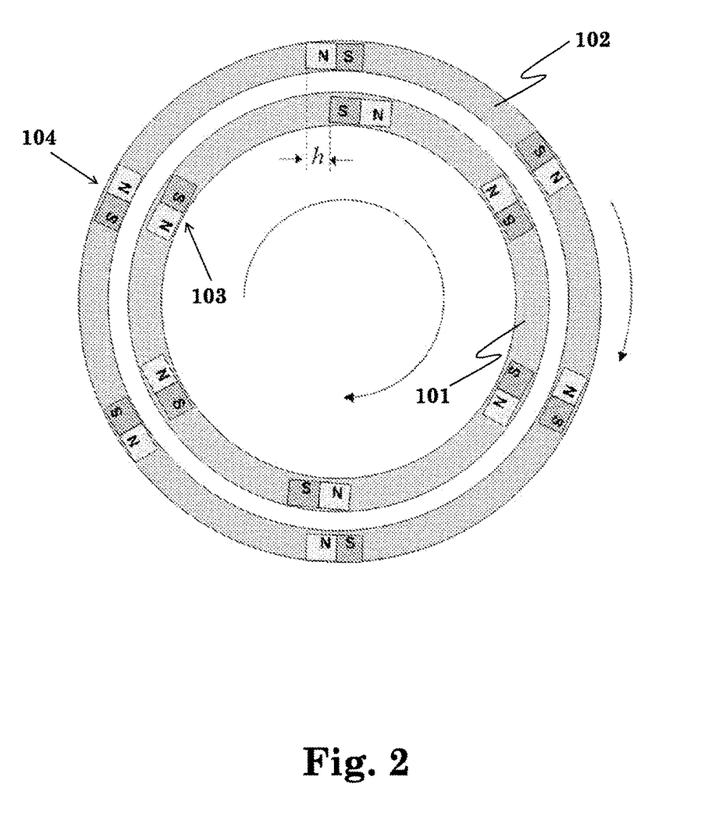
FIG. 2 shows the two rings of FIG. 1 in a dynamic state.

The corresponding magnets 103 and 104 will no longer be perfectly aligned. The relative position of the magnets will shift in a quasi-linear fashion tangentially to the circumference of the rings 101 and 102. The magnets 103 and 104 will reach an offset h as shown in FIG. 2, and will stabilize there. The offset h will depend on the opposing force exercised by the load. It will be seen that under proper conditions h will increase directly proportionally to the force needed to make the load ring 102 rotate along with the rotor ring 101.

It will be presented that in the range of interest, the offset h is roughly directly proportional to the force transfer, and as long as h is not too large, the rotor ring 101 will be able to "pull along" the load ring 102, without the occurrence of any physical contact between the two ring 101 and 102. When the size of h approaches the width of the gap between the magnets 103 and 104, the force transferred drops. The maximal force that the rotor ring 101 will be able to apply to the load ring 102 will depend on the strength and on the geometry of the permanent magnets, on the number of magnets, as well as on the gap between the two rings 101 and 102.

Figure 3:
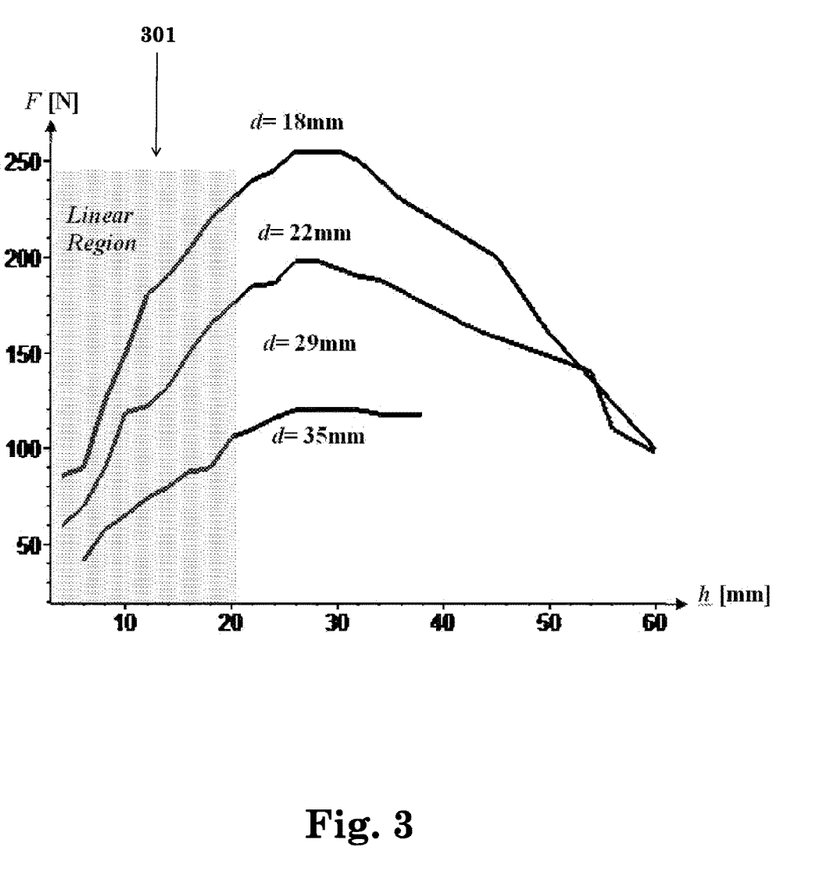
FIG. 3 shows the measurements of the force on a single couple of magnets mounted at distance d from each other and shifted linearly.

FIG. 3 shows the measurements of the force on a single couple of magnets mounted at distance d from each other and shifted linearly. The shaded area 301 shows the range for which the pulling force between the magnets 103 and 104 is roughly proportional to the offset h.

To illustrate the order of magnitude of the forces involved, two magnets with front-to-front separation of 29 mm, can provide roughly a maximal force transfer of 140N (about 14 Kg) in direction tangential to the ring.

In the BLDC motor demo system built according to the invention, there are 8 magnets were provided with face-to-face separation of about 30 mm. The demo system is capable to apply a force of 140×8=1120N (about 112 Kg). Since the outer ring 102 in the demo system has a radius of about 420 mm, the magnetic clutch should be able to transfer a torque of about 470 N-m.

Figure 4:
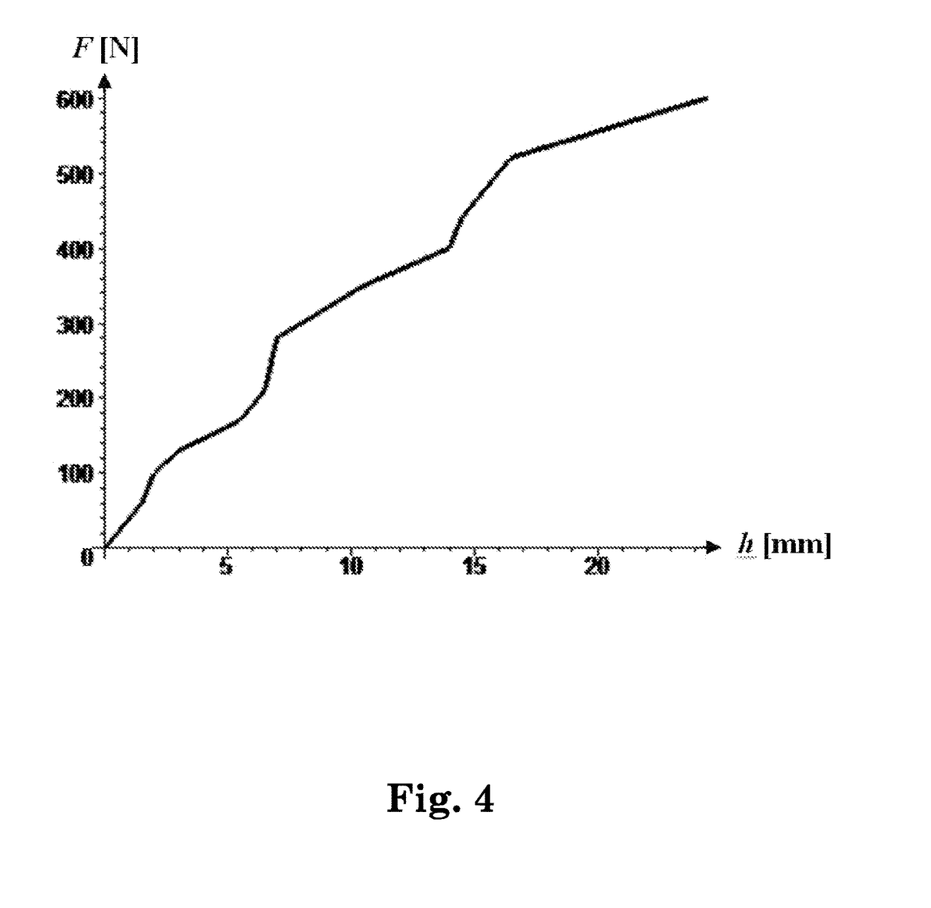
FIG. 4 shows the measurements of the force in a demo system, according to another embodiment of the invention.

In a measurement carried out on the BLDC demo system, and as shown in FIG. 4, the inventors did not try to achieve and measure the maximal power transfer, however, they showed force transfer measurements of the order of 600N, which is in good agreement with the order of magnitude of the maximal possible force (1120N) predicted by the measurements on one couple of magnets. Also it shows that the total force is proportional to the relative offset.

Figure 5:
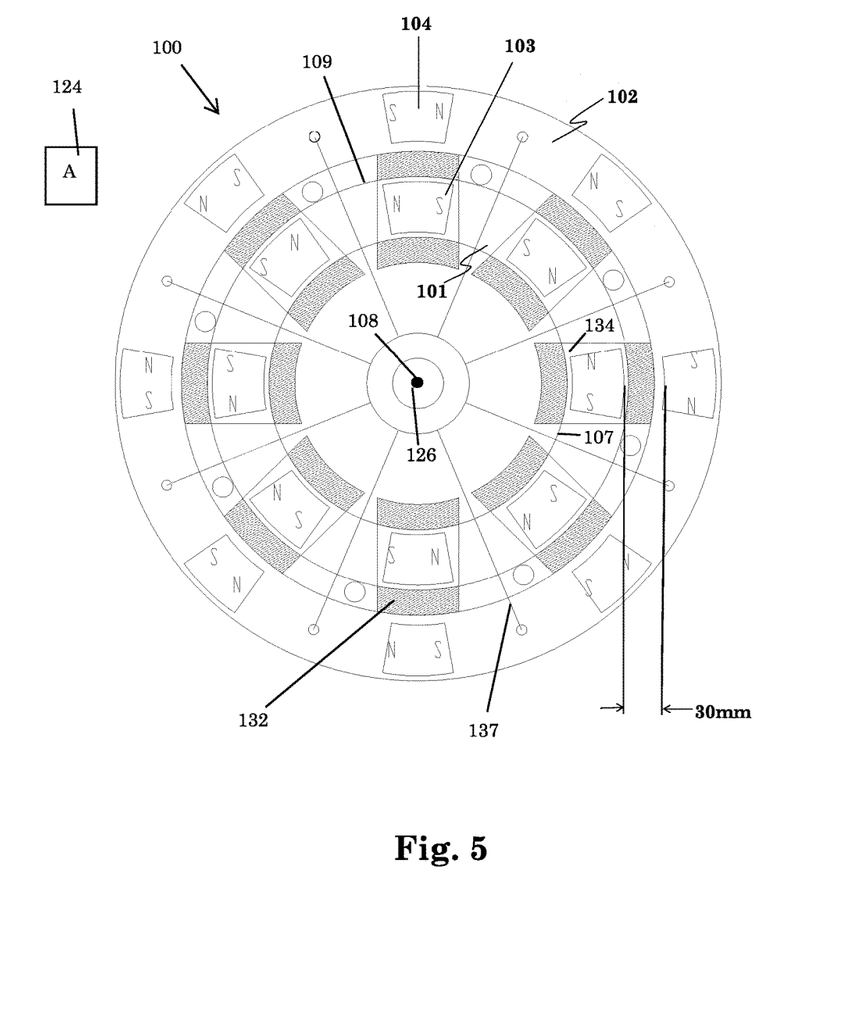
FIG. 5 shows exemplary physical measures of the components in a BLDC demo system, according to another embodiment of the invention.

The physical measures of the components in the BLDC demo system, as provided by the inventors, are shown in FIG. 5. From the figure one can see that the system includes 8 magnets, and the separation between the rotor ring 101 and the load ring 102 is 30 mm.

A plurality of circumferentially spaced and stationary air-core solenoids 132 constituting a stator of the Brushless DC Motor 100 encircle both the inner edge 107 and the outer edge 109 of inner ring 101. When inner ring 101 is rotated, the circumferentially spaced permanent magnets 103 fixed to inner ring 101 are allowed to pass through the interior 134 of each air-core solenoid 132. The rotation of inner ring 101 is made possible by the operation of schematically illustrated actuator 124, which may be embodied by a plurality of switches controlled by a microcontroller for determining, at each instant, the polarity and magnitude of voltage applied to each solenoid, as well as the average DC level.

During operation of actuator 124, the air-core solenoids 132 become energized and generate an electromagnetic field that produces a torque on a magnetic field of the magnet 103 passing through a given solenoid interior 134, causing inner ring 101 to rotate around its axis 108. As inner ring 101 rotates, outer ring 102 rotates as well under the influence of magnetic forces between each couple of magnetically facing magnets 102 and 103 of opposite magnetic polarity. Connecting means may connect the rotating outer ring 102 to a load 126. The connecting means may be, for example, a plurality of circumferentially spaced linear elements 137 that are connected to outer ring 102 and radially extend therefrom to a mechanical load 126 which is located at a center of the inner 101 and outer rings 102.

Magnetostatic computations are among the most difficult and complex tasks to be carried out analytically, and even when a closed-form analytical expression can be found, the resulting formulas are often too complex to provide a clear understanding of the phenomena. Moreover, most often, one can only perform computerized simulations obtained by numerically solving the field equations. Numerical solutions, however, although precise for a specific setup, do not provide an insight to the general behavior of the system.

Fortunately, in the specific case under consideration, general conclusions can be drawn by means of a relatively simple mathematical analysis. This is made possible because, in the system under consideration, the magnets are free to move only along a direction tangential to their S-N axis, and they are fixed in all other directions. Therefore, it is only needed to compute the component of the force in a direction parallel to the S-N axes of the magnets, which results in major mathematical simplifications that allow us to draw conclusion regarding general system features, without the need of actually solving the complex three-dimensional integrals involved.

Figure 6:
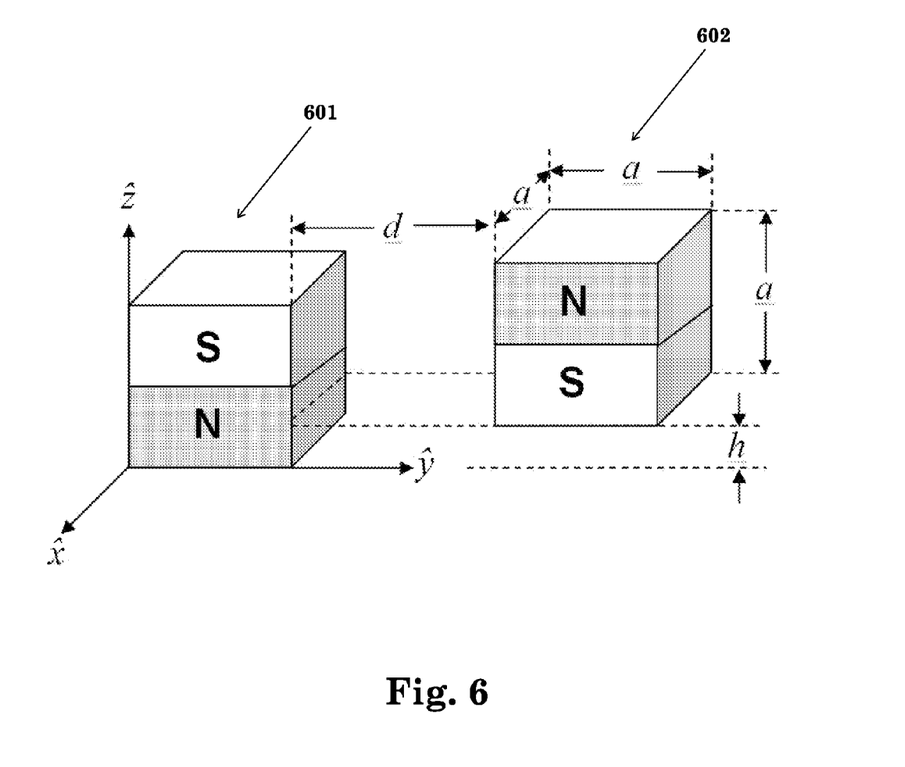
FIG. 6 shows a schematic setup of two magnets, according to another embodiment of the invention.

What was analyzed is the setup shown in FIG. 6. $\hat{x}$, $\hat{y}$ and $\hat{z}$ are mutually perpendicular unit vectors. Two cubic magnets 601 and 602 are positioned so that their S-N axes are parallel to direction $\hat{z}$. Their S-N orientation is opposite, and they are displaced with an offset h in direction $\hat{z}$. The magnets 601 and 602 are assumed cubic, for the purpose of this exemplary analysis, however the general conclusions hold true for other shapes as well. The measurements shown in FIG. 3 have been carried out on a similar setup.

Under this setup, as long as the offset h is small relatively to the physical dimension of the gap between the magnets 601 and 602, the component of the force acting on either magnet 601 and 602 in the direction $\hat{z}$, is directly proportional to the offset h. The size of h is relatively small, roughly when the offset h is less than ⅓ of the separation d between the magnets 601 and 602. As the offset becomes larger than that, the force reaches a maximal value, and then decreases with increasing h.

As a first step, by using the Amperian model, a permanent magnet with magnetization M in direction $\hat{z}$, may be modeled in the form of a uniform surface current density $J_s$ flowing on the surface of the magnet in direction perpendicular to $\hat{z}$. M is the net magnetic dipole moment per unit volume, and $J_s$ is the equivalent surface current per unit length. Therefore we may replace each magnet 601 and 601 in FIG. 6 by the equivalent "solenoids" shown in FIG. 7, with equal currents in opposite directions.

Figure 7:
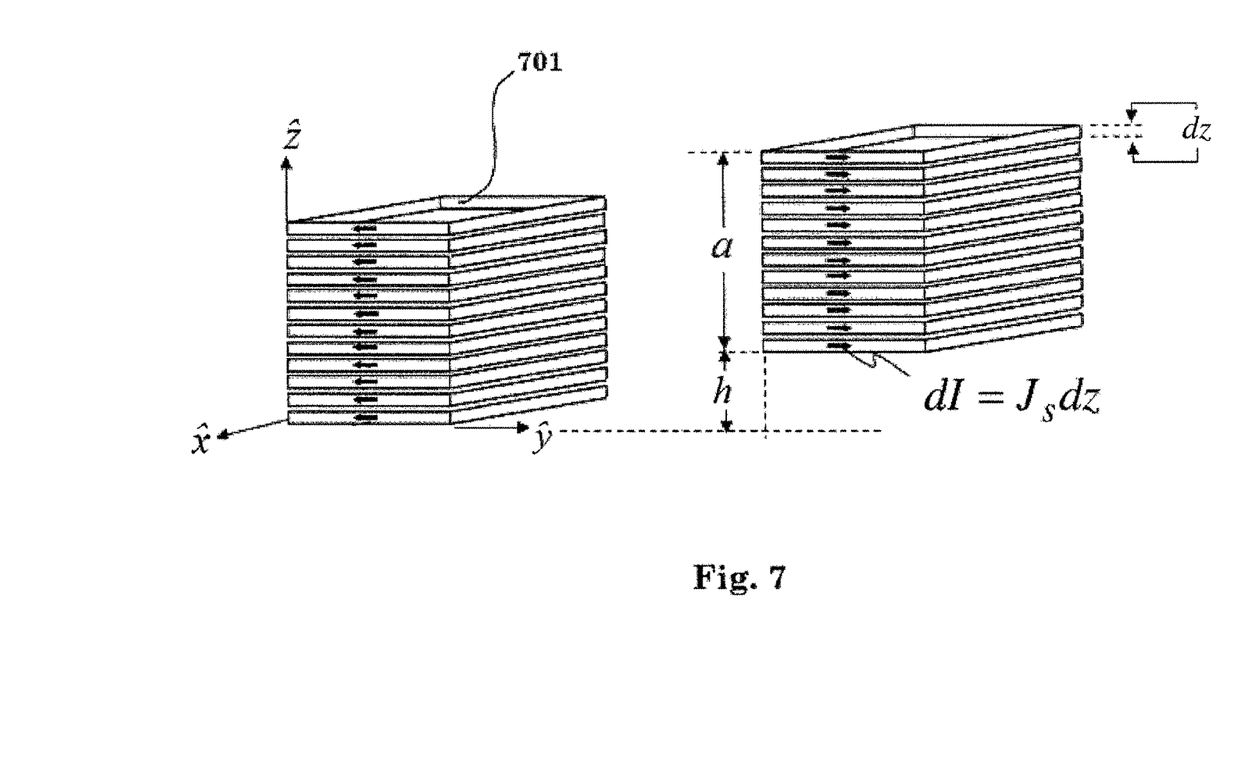
FIG. 7 shows solenoids illustrated as consisting of a collection of infinitesimal current loops, stacked one on top of the other.
Figure 8:
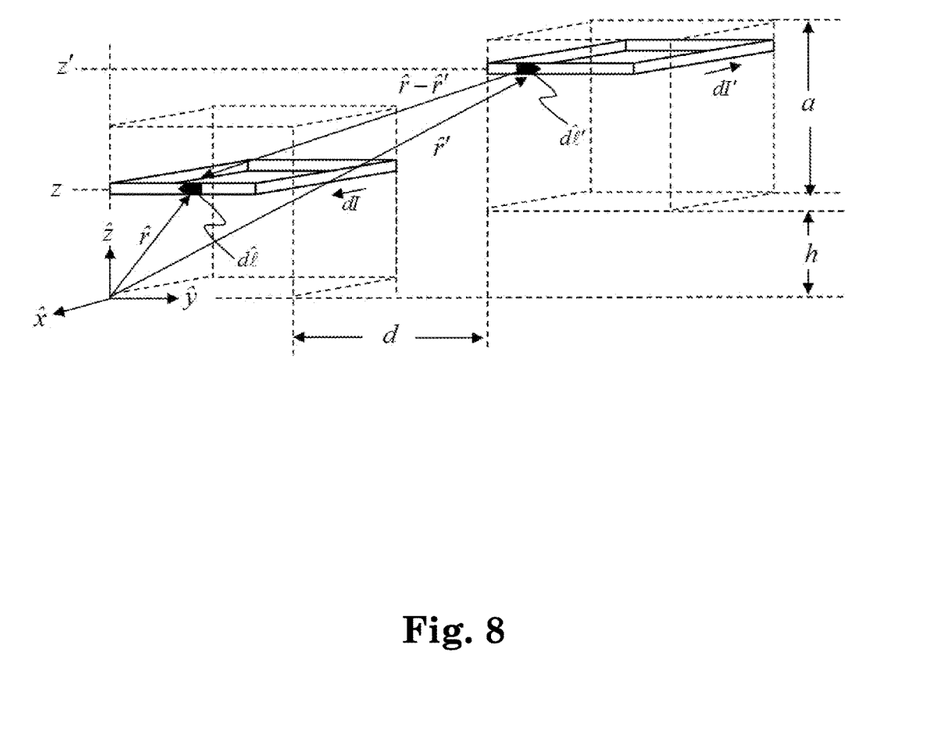
FIG. 8 shows two loops of infinitesimal thickness, each one belonging to a magnet.

Each solenoid 701 in FIG. 7 can be represented as consisting of a collection of infinitesimal current loops, stacked one on top of the other, carrying currents of amplitudes $dI=J_s dz$ and $dI'=J_s dz'$, flowing in the $\hat{x}\hat{y}$ plane in opposite directions. Let us consider now, two loops of infinitesimal thickness, each one belonging to one of the magnets as shown in FIG. 8.

The force caused on the left-side loop L located at vertical position z by the right-side loop L' located at vertical position z', is directly derived from Ampere's law of force, and is given by the expression $$\vec{F}_{p'p}(z,z') = -\frac{\mu dI' dI}{4\pi} \int_L \int_{L'} (d\hat{\ell} \cdot d\hat{\ell}') \frac{\hat{r}_{pp}}{|\hat{r}-\hat{r}'|^2} = -\frac{\mu dI' dI}{4\pi} \int_L \int_{L'} (d\hat{\ell} \cdot d\hat{\ell}') \frac{\hat{r}-\hat{r}'}{|\hat{r}-\hat{r}'|^3}$$

where $$\hat{r}_{p'p} = \frac{\hat{r}-\hat{r}'}{|r-\hat{r}'|}, \hat{r}-\hat{r}' = (x-x')\hat{x} + (y-y')\hat{y} + (z-z')\hat{z},$$

$$|\hat{r}-\hat{r}'| = \sqrt{(x-x')^2 + (y-y')^2 + (z-z')^2}$$

and $d\hat{\ell}$ and $d\hat{\ell}'$ are infinitesimal lengths in the direction of the current flow in the corresponding loops, and therefore they lie in the $\hat{x}\hat{y}$ plane.

Now, referring to FIG. 8, it points out several preliminary remarks:

1. We know that $|y-y'| \geq d$ and we denote $R_{\hat{x}\hat{y}} \equiv \sqrt{(x-x')^2+(y-y')^2}$. It follows that $R_{\hat{x}\hat{y}} \geq d$. $R_{\hat{x}\hat{y}} = R_{\hat{x}\hat{y}}(x, x', y, y')$ is independent from z and z', and we may write $$|\hat{r}-\hat{r}'| = \sqrt{R_{\hat{x}\hat{y}}^2 + (z-z')^2}.$$

2. In the present setting, d is comparable to the size of the magnet, and we assume offsets small enough so that $h^2 \ll d^2$ $$\left(\text{for instance } h < \frac{d}{3}\right).$$

3. Since we are interested only in the force in the $\hat{z}$ direction, the only relevant component of $\hat{r}-\hat{r}'$ in the numerator of the integrand, is the one in direction $\hat{z}$. All other forces are of no interest, since the magnets cannot move in other directions. Thus, in order to compute the force acting on the magnets in $\hat{z}$ direction, we may replace $\hat{r}-\hat{r}'$ in the numerator of the integrand by $(z-z')\hat{z}$.

4. $d\hat{\ell}$ and $d\hat{\ell}'$ are incremental vectors in the $\hat{x}\hat{y}$ plane. More precisely, in the present setting of square magnets, the scalar product $(d\hat{\ell} \cdot d\hat{\ell}')$ is either $\pm dxdx'$ or $\pm dydy'$. Therefore z and z' are constant with respect to the integration variables when integrating over the path of the loops. Moreover, if dx,dx' have opposite signs, their direction of integration is opposite too, and therefore, the limit of the corresponding integrals are reversed, and similarly for dy,dy'. The outcome is that the sign of the integral for all the various sub-integration ranges defined by $(d\hat{\ell} \cdot d\hat{\ell}')$ remains unchanged. Therefore the sign value of the double integral over the loop paths, is the same as the sign of the integrand.

With the above understanding, the force $\Delta F_z$ in direction $\hat{z}$ acting on the current loop L because of the current loop L', is the result of the following integral:

$$\Delta F_{\hat{z}} = -\frac{\mu J_s^2 dz' dz}{4\pi} \int_L \int_{L'} \frac{(d\hat{\ell} \cdot d\hat{\ell}')(z-z')}{[R_{\hat{x}\hat{y}}^2 + (z-z')^2]^{3/2}},$$

$$R_{\hat{x}\hat{y}} \equiv \sqrt{(x-x')^2 + (y-y')^2}, dI' = J_s dz', dI = J_s dz$$

The cumulative force $\Delta F_{\hat{z},L}$ applied by all the current loops on the right side on one single current loop L on the left side (see FIG. 8) is given by $$\Delta F_{\hat{z},L} = \int_h^{h+a} \Delta F_{\hat{z}} dz' = -\frac{\mu J_s^2 dz}{4\pi} \int_h^{h+a} \left(\int_L \int_{L'} \frac{(d\hat{\ell} \cdot d\hat{\ell}')(z-z')}{[R_{\hat{x}\hat{y}}^2 + (z-z')^2]^{3/2}}\right) dz'$$

The total force $F_{\hat{z}}(h)$ acting on the magnet located at the origin is the sum of all the forces on its loops $$F_{\hat{z}}(h) = \int_0^a \Delta F_{\hat{z},L} dz = -\frac{\mu J_s^2}{4\pi} \int_0^a \left[\int_h^{h+a}\left(\int_L \int_{L'} \frac{(d\hat{\ell} \cdot d\hat{\ell}')(z-z')}{[R_{\hat{x}\hat{y}}^2 + (z-z')^2]^{3/2}}\right) dz'\right] dz$$

Changing the order of integration we obtain $$F_{\hat{z}}(h) = -\frac{\mu J_s^2}{4\pi} \int_L \int_{L'} \left[\int_0^a \left(\int_h^{h+a} \frac{(z-z')}{[R_{\hat{x}\hat{y}}^2 + (z-z')^2]^{3/2}} dz'\right) dz\right] (d\hat{\ell} \cdot d\hat{\ell}')$$

Noting that $R_{\hat{x}\hat{y}}^2$ is independent from z and z', and therefore is constant when integrating with respect to dz and dz', the inner integrals can be computed analytically, and yield $$\int_0^a \left(\int_h^{h+a} \frac{(z-z')}{[R_{\hat{x}\hat{y}}^2 + (z-z')^2]^{3/2}} dz'\right) dz =$$

$$\ln\left\{\frac{[(\varepsilon-A)+\sqrt{1+(\varepsilon-A)^2}][(\varepsilon+A)+\sqrt{1+(\varepsilon+A)^2}]}{(\varepsilon+\sqrt{1+\varepsilon})^2}\right\}$$

where we used $$A = \frac{a}{R_{\hat{x}\hat{y}}}, \text{ and } \varepsilon = \frac{h}{R_{\hat{x}\hat{y}}}.$$

Since $R_{\hat{x}\hat{y}} \geq d$, then if $h^2 \ll d^2 \leq R_{\hat{x}\hat{y}}^2$ $$\left(\text{for instance } h < \frac{d}{3}\right)$$

then $$\frac{h^2}{R_{\hat{x}\hat{y}}^2} = \varepsilon^2 \ll 1,$$

and we may expand the last expression in a first-order Taylor series as follows $$\int_0^a \left( \int_h^{h+a} \frac{(z-z')}{[R_{\hat{x}\hat{y}}^2 + (z-z')^2]^{3/2}} dz' \right) dz =$$

$$2\frac{1-\sqrt{1+A^2}}{\sqrt{1+A^2}}\varepsilon + O(\varepsilon^3) \approx 2\frac{1-\sqrt{1+a^2/R_{\hat{x}\hat{y}}^2}}{\sqrt{1+a^2/R_{\hat{x}\hat{y}}^2}} \cdot \frac{h}{R_{\hat{x}\hat{y}}} = g(x, x', y, y') \cdot h$$

Since $$\sqrt{1+a^2/R_{\hat{x}\hat{y}}^2} > 1,$$

it follows that the function g(x,x',y,y') is some negative function of x,x', y, y', namely g(x,x', y, y')=−|g(x,x',y,y')|. Therefore, recalling that the sign of the double integral over x,x',y,y' is the same as the sign of the integrand, and setting $\int_L \int_L |g(x,x',y,y')|(d\hat{\ell}\cdot d\hat{\ell}')=K^2$, the total force $F_{\hat{z}}(h)$, acting on the magnet at the origin, due to the offset of the other magnet, has the form $$F_{\hat{z}}(h) \approx \frac{\mu J_s^2 h}{4\pi}\int_L\int_{L'}|g(x,x',y,y')|(d\hat{\ell}\cdot d\hat{\ell}') = \frac{K^2\mu J_s^2}{4\pi}h,$$

$$h^2 \ll d^2$$

where K is some proportionality constant. Finally, recalling that M=$J_s$ is the net magnetization per unit volume in the $\hat{z}$ direction, and referring to FIG. 6, the force acting on the left magnet is $$F_{\hat{z}}(h) = \frac{K^2\mu M^2}{4\pi}h, \quad h^2 \ll d^2$$

Thus, for any offset h<d/3, the force transferred by the clutch is directly proportional to the offset h and to the square magnetization per unit volume. Moreover, the force is in direction of the offset itself.

All the above description has been provided for the purpose of illustration and is not meant to limit the invention in any way. The computations shown above are provided as an aid in understanding the invention, and should not be construed as intending to limit the invention in any way.

The invention claimed is:

1. An apparatus for coupling mechanical power of a brushless DC motor with an external system comprising:
   A) a brushless DC motor, comprising:
      i) an inner ring which constitutes a rotor of said brushless DC motor, the inner ring having an inner edge and an outer edge; and
      ii) a plurality of circumferentially spaced and stationary air-core solenoids constituting a stator of said brushless DC motor, each of said air-core solenoids encircling both said inner edge and said outer edge of the inner ring;
   B) a magnetic coupler comprising—
      i) an outer ring concentric to, and radially spaced from, the inner ring;
      ii) an equal number of magnets connected to the inner ring and to the outer ring, wherein the magnets connected to the inner ring are circumferentially spaced one from each other the magnets connected to the outer ring are circumferentially spaced one from each other and a distance between two adjacent magnets on the inner or outer ring is not the same as the distance between two other adjacent magnets on the same ring; and
      iii) plurality of couples of facing magnets, wherein one magnet of each of said plurality of couples is connected to the inner ring, and its facing magnet is connected to the outer ring and of opposite magnetic polarity as said one magnet connected to the inner ring, wherein the magnets connected to the inner ring are configured to pass through an interior of each of said air-core solenoids.
   C) non-geared connecting means which connect the outer ring to a mechanical load of an external system; wherein, each of said air-core solenoids, when energized, generate an electromagnetic field that produces a torque on a magnetic field of the magnet of the inner ring passing through their interior to cause the inner ring to turn around its axis,
   wherein when the inner concentric ring rotates through the interior of each of said air-core solenoids in response to the generated electromagnetic field, the outer ring rotates as well by the action of magnetic forces between each couple of the facing magnets.

2. The system according to claim 1, wherein the inner and outer rings are planar.

3. The system according to claim 1, wherein the facing magnets of each of the plurality of couples are of a substantially same volume.

4. The system according to claim 1, wherein flux densities of two facing magnets are essentially equal.

5. The system according to claim 1, wherein each of the magnets in the inner ring has a facing magnet in the outer ring.

6. The system according to claim 1, wherein a distance between components of the apparatus are consistent with desired forces.

* * * * *